United States Patent
Wenzel et al.

(10) Patent No.: US 12,071,496 B2
(45) Date of Patent: Aug. 27, 2024

(54) AQUEOUS COPOLYMER DISPERSIONS AND THEIR USE IN COATING COMPOSITIONS

(71) Applicant: CELANESE INTERNATIONAL CORPORATION, Irving, TX (US)

(72) Inventors: Kerstin Wenzel, Wiesbaden-Delkenheim (DE); Narayan Raman, Cincinnati, OH (US); Tsz Ming Tsang, Cincinnati, OH (US); James Martin, Lake Side Park, KY (US)

(73) Assignee: Celanese International Corporation, Irving, TX (US)

( * ) Notice: Subject to any disclaimer, the term of this patent is extended or adjusted under 35 U.S.C. 154(b) by 529 days.

(21) Appl. No.: 17/435,129

(22) PCT Filed: Feb. 27, 2020

(86) PCT No.: PCT/US2020/020151
§ 371 (c)(1),
(2) Date: Aug. 31, 2021

(87) PCT Pub. No.: WO2020/180617
PCT Pub. Date: Sep. 10, 2020

(65) Prior Publication Data
US 2022/0041776 A1 Feb. 10, 2022

Related U.S. Application Data

(60) Provisional application No. 62/814,978, filed on Mar. 7, 2019.

(51) Int. Cl.
| | |
|---|---|
| C08F 210/02 | (2006.01) |
| C08F 2/00 | (2006.01) |
| C08F 2/20 | (2006.01) |
| C08F 2/26 | (2006.01) |
| C08F 2/30 | (2006.01) |
| C08F 218/08 | (2006.01) |
| C08F 220/18 | (2006.01) |
| C09D 5/02 | (2006.01) |
| C09D 7/65 | (2018.01) |

(52) U.S. Cl.
CPC ........ *C08F 220/1804* (2020.02); *C08F 2/001* (2013.01); *C08F 2/20* (2013.01); *C08F 2/26* (2013.01); *C08F 2/30* (2013.01); *C08F 210/02* (2013.01); *C08F 218/08* (2013.01); *C09D 5/022* (2013.01); *C09D 7/65* (2018.01)

(58) Field of Classification Search
None
See application file for complete search history.

(56) References Cited

U.S. PATENT DOCUMENTS

| | | |
|---|---|---|
| 6,656,998 B1 | 12/2003 | Robeson et al. |
| 6,667,352 B1 | 12/2003 | Kusters et al. |
| 7,078,455 B2 | 7/2006 | Heldmann et al. |
| 2005/0107527 A1 | 5/2005 | Holub et al. |
| 2009/0203814 A1 | 8/2009 | Petri et al. |
| 2014/0350172 A1 | 11/2014 | Belmonte Rodrigues De Castro et al. |
| 2015/0037572 A1* | 2/2015 | Amano ............... C09J 133/02 428/354 |
| 2017/0029544 A1* | 2/2017 | Mueller ............. C08F 2/22 |

OTHER PUBLICATIONS

International Search Report and Written Opinion issued in the corresponding Patent Application No. PCT/US2020/020151 on Jun. 5, 2020.

* cited by examiner

*Primary Examiner* — Richard A Huhn
(74) *Attorney, Agent, or Firm* — Kilpatrick Townsend & Stockton LLP

(57) ABSTRACT

An aqueous copolymer dispersion is obtained by a multi-stage emulsion polymerization process comprising polymerizing in a reaction zone in a first polymerization stage a first monomer composition comprising at least 88 wt % of a vinyl ester of a $C_1$ to $C_{18}$ carboxylic acid and up to 12 wt % ethylene to produce a first stage polymer having Tg>20° C.; and polymerizing in the reaction zone, in a second polymerization stage and in the presence of the first stage polymer, a second monomer composition comprising a vinyl ester of a $C_1$ to $C_{18}$ carboxylic acid and a $C_2$ to $C_8$ alkyl ester of (meth)acrylic acid to produce a second stage polymer having Tg≤20° C. Each of the polymerization stages is conducted in the presence of a stabilizing system comprising at least 0.1 wt % of a protective colloid and at least 0.05 wt % of an ionic surfactant.

16 Claims, No Drawings

AQUEOUS COPOLYMER DISPERSIONS AND THEIR USE IN COATING COMPOSITIONS

CROSS-REFERENCE TO RELATED APPLICATIONS

The present application is a U.S. National Phase of PCT/US2020/020151 filed on Feb. 27, 2020 claiming priority to the U.S. provisional patent application No. 62/814,978 filed on Mar. 7, 2019. The disclosure of the PCT Application is hereby incorporated by reference into the present Application.

FIELD

The present invention relates to aqueous copolymer dispersions and their use in coating compositions, such as high gloss trim paints, lacquers, stains and varnishes.

BACKGROUND

The need today for architectural coating materials free from volatile organic content (VOC) for both safety and health reasons is well documented. The switch to water-borne or high solids paints, especially those based on vinyl ester copolymer binders, has answered this need, but there still remains a problem with respect to paints where surface luster is important, such as in satin, semi-gloss and high gloss paints. Such paints need to have good blocking resistance to keep painted surfaces, such as on doors and windows, from sticking. This problem has previously been addressed by incorporating organic solvents, but this approach partially defeats a major advantage of using water-based paints. While the blocking problem can be alleviated by incorporating "hard" polymers, i.e. polymers having a relatively high glass transition temperature ($T_g$), into the formulation, this step has often resulted in the reduction of gloss values in the finished coating. It is also important that the finished coating has excellent stain resistance.

In an attempt to address the blocking problem, U.S. Pat. No. 6,656,998 proposes a glossy, water-borne paint formulation utilizing a blend of aqueous emulsions consisting essentially of a first emulsion of a polymer of vinyl acetate having a dry $T_g$ above room temperature but a wet $T_g$ below room temperature, said first emulsion being film-forming at room temperature, and a second emulsion of a copolymer of vinyl acetate, ethylene, and optionally a third monomer, or a copolymer of vinyl acetate, an alkyl acrylate, and optionally a third monomer, said copolymer of said second emulsion having a dry $T_g$ below 20° C., wherein said glossy, water-borne paint, when applied as a coating and dried, has an ASTM 60° gloss of at least 20.

Another proposed solution to the problem of blocking is provided in US Patent Application Publication No. 2009/0203814, which discloses a multi-stage, aqueous copolymer dispersion derived from at least one homo- or copolymer A and at least one homo- or copolymer B in a weight ratio in the range from 95/5 to 5/95, wherein the copolymer A is derived from a monomer composition A which would give a soft copolymer having a first glass transition temperature in the range from 0 to 20° C., the homo- or copolymer B is derived from a monomer composition B which would give a hard homo- or copolymer having a second glass transition temperature in the range from 20 to 50° C., and wherein the difference between the first and second glass transition temperatures is at least 10° K. Each of the monomer compositions A and B contains from 50 to 100% by weight of at least one vinyl ester of a carboxylic acid having 1 to 18 carbon atoms and at least one of the monomer compositions A or B contains from 0.05 to 10% by weight of at least one unsaturated, copolymerizable organosilicon compound. The aqueous copolymer dispersion contains at least 0.5% by weight of nonionic emulsifiers and the ratio of the total mass of ionic components to the total amount of nonionic components used in producing the dispersion is less than 1. A similar copolymer dispersion but predominantly stabilized by ionic emulsifiers is disclosed in U.S. Pat. No. 7,078,455.

US Patent Application Publication No. 2005/0107527 discloses an aqueous polymer dispersion useful in coating compositions that exhibit improved block resistance and including a multi-stage emulsion polymer made by a process that includes a first polymerization stage, in which a first monomer mixture having a calculated glass transition temperature of at least about 50° C. is polymerized via free radical emulsion polymerization to obtain a first-stage emulsion polymer, and a second polymerization stage, in which a second monomer mixture having a calculated glass transition temperature from about −30° C. to about 10° C. is polymerized via free radical emulsion polymerization, in the presence of the first-stage emulsion polymer.

Despite these advances, there remains interest in developing new polymer dispersions suitable for producing glossy coatings which exhibit improved block resistance and stain resistance.

SUMMARY

According to the present invention, there is provided an aqueous copolymer dispersion obtained by a free radical-initiated multi-stage emulsion polymerization process comprising:
 (a) polymerizing in a reaction zone in a first polymerization stage a first monomer composition comprising at least 88 weight percent of at least one vinyl ester of a $C_1$ to $C_{18}$ carboxylic acid and up to 12 weight percent ethylene to produce a first stage polymer having a glass transition temperature Tg of greater than 20° C.; and
 (b) polymerizing in the reaction zone, in a second polymerization stage and in the presence of the first stage polymer, a second, different monomer composition comprising at least one vinyl ester of a $C_1$ to $C_{18}$ carboxylic acid and at least one $C_2$ to $C_8$ alkyl ester of acrylic or methacrylic acid in an amount up to 30 weight percent of the total monomers in the second monomer composition to produce a second stage polymer having a glass transition temperature Tg of less than or equal to 20° C.,
 wherein the first monomer composition is substantially free of $C_2$ to $C_8$ alkyl esters of acrylic or methacrylic acid;
 wherein the second monomer composition is metered into the reaction zone during at least part of the second polymerization stage, and
 wherein each of the polymerization stages (a) and (b) is conducted in the presence of a stabilizing system which comprises at least 0.1 wt % of at least one protective colloid, at least 0.05 wt % of at least one ionic surfactant and less than 2 wt % of nonionic surfactant, all percentages in the stabilizing system being based on the total weight of monomers in the first and second monomer compositions.

The invention also relates to coating compositions having improved block resistance and stain resistance produced from the aqueous copolymer dispersions described herein.

DETAILED DESCRIPTION

The present invention relates to aqueous vinyl ester-based copolymer dispersions and their use in producing glossy coating compositions having a unique combination of good block resistance and stain resistance. In particular, the present invention provides a coating composition comprising an aqueous copolymer dispersion obtained by a free radical-initiated multi-stage emulsion polymerization process, in which a first monomer composition comprising at least 88 weight percent of at least one vinyl ester of a $C_1$ to $C_{18}$ carboxylic acid and up to 12 weight percent ethylene is polymerized in a reaction zone in a first polymerization stage to produce a first stage polymer having a glass transition temperature Tg of greater than 20° C., preferably at least 26° C. A second, different monomer composition comprising at least one vinyl ester of a $C_1$ to $C_{18}$ carboxylic acid and at least one $C_2$ to $C_8$ alkyl ester of acrylic or methacrylic acid in an amount up to 30 weight percent of the total monomers in the second monomer composition is then polymerized in the reaction zone, in a second polymerization stage and in the presence of the first stage polymer, to produce a second stage polymer having a glass transition temperature Tg of less than or equal to 20° C., such as from 0° C. to 20° C., preferably from 5° C. to 20° C., more preferably from 7 to 20° C.

The second monomer composition is gradually metered into the reaction zone, either at a varying rate or, more preferably, at a constant rate, during at least part of the second polymerization stage. In contrast, in most embodiments, all of the vinyl ester of a $C_1$ to $C_{18}$ carboxylic acid and any ethylene present in the first monomer composition are added to the reaction zone before initiation of the first polymerization stage.

Each of the first and second polymerization stages is conducted in the presence of a stabilizing system which comprises at least 0.1 wt % of at least one protective colloid, at least 0.05 wt % of at least one ionic surfactant and less than 2 wt % of nonionic surfactant, all percentages in the stabilizing system being based on the total weight of monomers in the first and second monomer compositions.

It is to be appreciated that all glass transition temperatures of the polymers referred to herein are as calculated using the equation by Fox (T. G. Fox, Bull. Am. Ph. Soc. (Ser. 11) 1, 123 [1956] and Ullmann's Enzyklopadie der technischen Chemie [Ullmann's Encyclopedia of Industrial Chemistry], Weinheim (1980), Volume 19, page 1-7-18), according to which the equation:

$$1/T_g = X^1/T_g^1 + X^2/T_g^2 + \ldots X^n/T_g^n$$

is a good approximation for the glass transition temperature $T_g$ of copolymers in the case of high molar masses, $X^1, X^2, \ldots X^n$ being the mass fractions $1, 2, \ldots n$ and $T_g^1$, $T_g^2, \ldots T_g^n$ being the glass transition temperatures, in degrees Kelvin, of the polymers composed in each case of only one of the monomers $1, 2 \ldots n$. The latter are disclosed, for example, in Polymerdatabase.com (2015) or in Brandrup, E. H. Immergut, Polymer Handbook, 3d ed, J. Wiley, New York 1989, such as, for example, the glass transition temperature of the ethene homopolymer of 193° K (cf. Polymerdatabase.com) and the glass transition temperature of the vinyl acetate homopolymer of 315° K (cf. Ullmann's Encyclopedia of Industrial Chemistry, VCH Weinheim, Vol. A 21 (1992) page 169). In a simplified calculation of the glass transition temperatures, it is possible to take into account only the main monomers mainly contributing to the formation of the phases and to neglect the contributions of any further monomers which result from mass fractions of less than 2% by weight, provided that the total sum of the mass fractions of these monomers does not exceed 4% by weight.

First and Second Monomer Compositions

Each of the first and second monomer compositions comprises one or more vinyl esters of a $C_1$ to $C_{18}$ carboxylic acid. In the case of the first monomer composition, these vinyl ester(s) comprise at least about 88 weight percent, such as least about 90 weight percent and up to about 92 weight percent, such as up to about 95 weight percent, for example up to about 100 weight percent of the total monomers in the first monomer composition. In the case of the second monomer composition, these vinyl ester(s) may comprise at least about 50 weight percent, such as at least about 70 weight percent, for example at least about 80 weight percent, of the second monomer composition, based on the total weight of monomers in the second monomer composition.

Suitable vinyl esters include vinyl esters of straight-chain and/or branched aliphatic carboxylic acids having from one to eighteen carbon atoms. In addition, it is also possible to use vinyl esters of aromatic carboxylic acids. Mixtures of different vinyl esters can also be used.

The preferred vinyl ester monomers include vinyl formate, vinyl acetate, vinyl propionate, vinyl butyrate, vinyl isobutyrate, vinyl pivalate, vinyl 2-ethylhexanoate, vinyl esters of saturated branched monocarboxylic acids having from 9 to 11 carbon atoms in the acid radical, such as VeoVa™ 9, VeoVa™ 10 and VeoVa™ 11, vinyl esters of relatively long-chain saturated or unsaturated fatty acids, for example vinyl laurate or vinyl stearate, and also vinyl esters of benzoic acid and substituted derivatives of benzoic acid, such as vinyl p-tert-butylbenzoate. Vinyl acetate is particularly preferred for each of the first and second monomer compositions.

In addition to the afore-mentioned vinyl ester(s), the first monomer composition may comprise ethylene in an amount up to 12 weight percent, such as up to 8.5 weight percent, based on the total monomers in the first monomer composition. In some embodiments, the first monomer composition does not contain ethylene.

In addition to the afore-mentioned vinyl ester(s), the second monomer composition comprises at least one $C_2$ to $C_8$ alkyl ester of acrylic or methacrylic acid in an amount up to 30 weight percent, such as up to about 15 weight percent, such as up to about 10 weight percent, based on the total monomers in the second monomer composition. Typically, the minimum amount of (meth)acrylic ester in the second monomer composition is at least 2 weight percent, such as up at least 5 weight percent, based on the total monomers in the second monomer composition. Generally, the first monomer composition is substantially free of $C_2$ to $C_8$ alkyl esters of acrylic or methacrylic acid. In this context, "substantially free" means contains less than 0.05 percent by weight of the $C_2$ to $C_8$ alkyl esters of acrylic or methacrylic acid.

Preferred $C_2$ to $C_8$ alkyl esters of acrylic or methacrylic acid for use in the present coating composition are those with a Tg of the homopolymer of less than 0° C., such as ethyl acrylate, isopropyl acrylate, n-butyl acrylate, sec-butyl acrylate, 2-ethylhexyl acrylate and 2-ethylhexyl methacrylate, with n-butyl acrylate being especially preferred.

In addition to the afore-mentioned vinyl ester(s) and (meth)acrylic acid esters, the second monomer composition may comprise ethylene in an amount up to 25 weight percent, such as up to 20 weight percent, for example from 2 to 15 weight percent, based on the total monomers in the second monomer composition.

In some embodiments, each of the first and second monomer compositions may further comprise from 0.05 weight percent to about 5 weight percent, based on the total monomers in the respective monomer composition, of at least one stabilizing monomer selected from an ethylenically unsaturated sulfonic acid, an ethylenically unsaturated phosphoric acid, an ethylenically unsaturated phosphonic acid and salts thereof. Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid and vinylbenzenesulfonic acid. Examples of suitable ethylenically unsaturated phosphonic acids also include those having 2-8 carbon atoms, such as vinylphosphonic acid. In addition to or instead of the acids, it is possible to use the salts thereof, preferably the alkali metal or ammonium salts, particularly preferably the sodium salts such as, for example, the sodium salts of vinylsulfonic acid and of 2-acrylamidopropanesulfonic acid. In most embodiments, at least part of the stabilizing monomer is metered gradually into the polymerization reactor during the first polymerization stage. Similar metering can be used for the addition of the stabilizing monomer to the second monomer composition.

Optionally, one or both of the first and second monomer compositions may further comprise up to 5 weight percent, such as from 0.05 weight percent to about 5 weight percent, based on the total monomers in the respective monomer composition, of at least one of an ethylenically unsaturated mono- and/or dicarboxylic acid and/or an amide thereof. Suitable monomers include ethylenically unsaturated $C_3$-$C_8$ monocarboxylic acids and ethylenically unsaturated $C_4$-$C_8$ dicarboxylic acids, together with the anhydrides or amides thereof and the monoesters of ethylenically unsaturated $C_4$-$C_8$ dicarboxylic acids. Examples of ethylenically unsaturated $C_3$-$C_8$ monocarboxylic acids include acrylic acid, methacrylic acid and crotonic acid, and the anhydrides and amides thereof. Examples of ethylenically unsaturated $C_4$-$C_8$ dicarboxylic acids include maleic acid, fumaric acid, itaconic acid and citraconic acid, and the mono- or bis-amides thereof and their monoesters with $C_1$-$C_{12}$, preferably $C_1$-$C_4$, alkanols, such as, for example, monomethyl maleate and mono-n-butyl maleate.

Further optional comonomers for use in one or both of the first and second monomer compositions are epoxy-functional, ethylenically unsaturated compounds, such as glycidyl methacrylate, glycidyl acrylate and/or vinylepoxycyclohexane. These comonomers can be present in an amount up to 10% by weight, preferably up to 5% by weight, of the total monomers in the respective monomer composition.

Further optional comonomers for use in the one or both of the first and second monomer compositions, especially the second monomer composition, are siloxane-functional, ethylenically unsaturated compounds such as acryloyloxyalkyltri(alkoxy)silanes and methacryloyloxyalkyltri(alkoxy)silanes, vinyltrialkoxysilanes and/or vinylalkyldialkoxysilanes. These comonomers can be present in an amount up to 5% by weight, preferably up to 3% by weight, preferably up to 1% by weight, of the total monomers in the respective monomer composition.

Further optional comonomers for use in the one or both of the first and second monomer compositions are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate, or mixtures of two or more compounds from this group. These comonomers can be present in an amount up to 10% by weight, preferably up to 2% by weight, of the total monomers in the respective monomer composition.

Further optional comonomers for use in the one or both of the first and second monomer compositions are hydroxy-functional esters of unsaturated carboxylic acids, such as hydroxyethyl(meth)acrylate, hydroxypropyl(meth)acrylate and adducts thereof with ethylene oxide or propylene oxide. These comonomers can be present in an amount up to 10% by weight, preferably up to 5% by weight, of the total monomers in the respective monomer composition.

Further optional comonomers for use in the one or both of the first and second monomer compositions are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth)acrylate, N-ethanol (meth)acrylamide, N-propanol(meth)acrylamide, (meth)acrylamide, allyl carbamate, acrylonitrile, the N-methylol esters, N-methylol alkyl ethers or Mannich bases of N-methylol(meth)acrylamide or N-methylolallyl carbamate, acrylamidoglycolic acid and/or salts thereof, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone methacrylate or N-vinylformamide, N-vinylpyrrolidone. These comonomers can be present in an amount up to 5% by weight, preferably up to 3% by weight, of the total monomers in the respective monomer composition.

Another optional comonomer for use in the one or both of the first and second monomer compositions is at least one wet adhesion improving monomer, preferably selected from the group consisting of acetoacetoxy ethyl(meth)acrylate, allyl acetoacetate, N-vinylurea, N-allylurea, N-vinylimidazolidin-2-one- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one, N-(2-(meth)acryloxyacetamidoethyl)imidazolidin-2-one and N-2-(allylcarbamate)aminoethylimidazolidone. The adhesion improving monomer is preferably present in the monomer mixture in an amount of up to 10 percent by weight, preferably of up to 5 percent by weight, based on the total weight of the radically polymerizable monomers used in the respective monomer mixture.

Preferably, the weight ratio of the first monomer composition to the second monomer composition is in the range from 5:95 to 95:5, such as in the range of 20:80 to 40:60.

Dispersion Stabilization System

Both during and after polymerization, the multi-stage polymer described herein is stabilized in the form of an aqueous copolymer dispersion or latex. The copolymer dispersion is therefore prepared in the presence of and subsequently contains a stabilization system which generally comprises at least one protective colloid and at least one ionic surfactant, in particular anionic surfactant. Nonionic surfactants can also be present but generally are not preferred.

Suitable protective colloids, i.e. polymeric stabilizers, include vinyl alcohol polymers and copolymers, methylcelluloses, hydroxyethyl- and propylcelluloses, and also sodium carboxymethylcellulose, gelatin, casein, starch, gum arabic, hydroxy ethyl starch and sodium alginate. The preferred protective colloids are vinyl alcohol polymers and copolymers, especially copolymers of vinyl alcohol and vinyl pyrrolidone. Mixtures of protective colloids can also be used. Typically, the amount of protective colloid, based on the total amount of monomers used, is at least 0.1 weight percent, such as from 0.1 to 5 weight percent, preferably from 0.3 to 3 weight percent.

Examples of suitable ionic surfactants include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium or potassium alkyl sulfates, sulfated alkyl or aryl ethoxylates with EO degree between 1 and 30, for example ethoxylated sodium lauryl ether sulfate or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols. Particularly suitable are alkyl($C_{10}$-$C_{20}$) arylsulfonates, such alkylbenzenesulfonates, sodium or potassium alkyl sulfates such as sodium lauryl sulfate, and sodium, potassium or ammonium salts of sulfated $C_{10}$-$C_{16}$ alkyl ethoxylates with an EO degree between 1 and 30.

When ionic emulsifiers are used, the amount thereof, based on the total amount of monomers used, is typically at least 0.05 weight percent, such as from 0.05 to 10 weight percent, preferably from 0.05 to 5.0 weight percent, more preferably from 0.05 to 3 weight percent and most preferably from 0.1 to 2 weight percent.

Although their use is not preferred, examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol.

The amount of nonionic emulsifiers used in preparing the copolymer dispersions herein is typically less than 2 weight percent, preferably less than 1.5 weight percent, more preferably less than 0.75 weight percent, based on the total monomer quantity.

Multi-Stage Polymerization Process

The copolymer dispersion employed in the present coating composition is produced by multi-stage emulsion polymerization of the monomers and stabilizing system described above in an aqueous medium and in the presence of one or more free radical initiators. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a C8-C12 chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents. Where redox couples are used for initiation, the oxidizer and reduced are generally metered into the polymerization mixture during each polymerization stage.

The multi-stage emulsion polymerization may be carried out in accordance with the customary techniques of emulsion polymerization. Preferably, the process is carried out by polymerizing in a first stage the first monomer composition in an aqueous phase in the presence of the surfactant(s), protective colloid and initiators at suitable temperatures of, for example from 20 to 120° C., preferably 40 to 110° C., and most preferably 50 to 95° C. to produce a first polymer phase. The reaction temperature may also be ramped up during of the polymerization as described in U.S. patent application 2017/029544. In some embodiments, at least the main monomers, namely the one or more vinyl esters of a $C_1$ to $C_{18}$ carboxylic acid and, where present, ethylene, are pre-added to the polymerization reactor prior to initiation of the first polymerization stage. At least part of the stabilizing monomer, namely the ethylenically unsaturated sulfonic, phosphonic and/or phosphoric acid or salt thereof may then be metered into the reaction zone during at least part of the first polymerization stage.

After the complete or virtually complete conversion of at least 80%, such as at least 85%, such as at least 90%, preferably at least 95%, by weight of the first stage monomers, the second monomer composition is polymerized in a second stage in the aqueous phase in the presence of the first polymer phase as well as surfactants, protective colloids initiators at suitable temperatures of, for example, from 20 to 120° C., preferably 40 to 110° C., more preferably from 50 to 95° C., to produce the second polymer phase and thereby to obtain polymer particles comprising the first and second polymer phase. The monomers of the second monomer composition are preferably metered into the polymerization reactor during the second polymerization stage, optionally together with additional quantities of the stabilizing monomer.

In some embodiments, it may be desirable to pre-polymerize a small amount (less than 10 weight %) of the first monomer composition to produce an in-situ seed before the remaining amounts of the first and second monomer compositions are sequentially added into the reactor to form the final polymer dispersion.

On completion of polymerization in the second stage, for demonomerization, a further, preferably chemical aftertreatment, especially with redox catalysts, for example combinations of the abovementioned oxidizing agents and reducing agents, may follow. In addition, residual monomer present can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

Polymer Dispersions

The aqueous multistage dispersions produced by the present process typically have a solids contents of from 20 to 70% by weight, preferably from 30 to 65% by weight and more preferably from 40 to 60% by weight, and a pH between 2 and 7, preferably between 3.5 and 6.

In some embodiments, additional protective colloid or emulsifier is post-added to the product of the multi-stage polymerization process described above. Preferred post-added protective colloids are vinyl alcohol polymers and copolymers, especially copolymers of vinyl alcohol and vinyl pyrrolidone. Mixtures of protective colloids can also be used. Typically, the amount of post-added protective colloid, based on the solids content of the polymer dispersion, is from 0.1 to 3 parts by weight, preferably from 0.2 to 2 parts by weight.

The aqueous multistage polyvinyl ester compositions described herein are stable dispersions which can be used to produce coating compositions suitable for coating a multitude of substrates. Suitable substrates are, for example, wood, concrete, metal, glass, ceramics, plastic, plasters, wallpaper, other paper, or painted, primed or weathered substrates. The coating composition is applied to the substrate to be coated in a manner dependent on the configuration of the coating composition. The application can, depending on the viscosity and the pigment content of the formulation and on the substrate, be effected by means of rolling, brushing, knife coating, dipping or as a spray.

Preferred uses of such coating compositions are in semi- or high gloss paints, lacquers, stains and varnishes, particularly solvent- and plasticizer-free paints. When used in such applications, the aqueous multistage dispersions produced by the present process is typically combined with one or more conventional fillers and/or pigments. In this context, pigments are understood as meaning solids which have a refractive index greater than or equal to 1.75, whereas fillers are understood as meaning solids which have a refractive index of less than 1.75.

Examples of mineral fillers are alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions. When used in plasters and renders, the filler generally has a particle size of at least 40 µm, whereas when used in a paint, the filler typically has a size of 1 to 40 µm.

Pigments may be any inorganic or organic and may be color-imparting or opaque finely divided solids. Preferred pigments have a mean diameter for the primary particle of less than or equal to 1 µm, preferably from 0.1 to 0.5 µm, determined by sedimentation analysis according to DIN 66115. Examples of inorganic pigments are metal oxides, such as titanium dioxide, iron oxide or zinc oxide, in particular titanium dioxide. Examples of organic pigments are phthalocyanines, in particular phthalocyanine blue, or diaryl pigments, azo pigments or quinacridone pigments.

To disperse the fillers and pigments in water, auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the coating compositions described herein. Thickeners which may be used include, inter alia, cellulose derivates such as methylcellulose (MC), hydroxyethylcellulose (HEC) and carboxymethyl-cellulose. Other thickeners which may be used include casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available. Inorganic thickeners, such as, for example, bentonites or hectorite, may also be used.

For various applications, it is sometimes also desirable to include small amounts of other additives, such as bactericides, pH modifiers, and antifoamers, incorporated in the latex paint compositions herein. This may be done in a conventional manner and at any convenient point in the preparation of the latexes.

The coating compositions may also comprise crosslinking additives. Such additives may be: aromatic ketones, for example alkyl phenyl ketones, which may have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable crosslinking compounds are also water-soluble compounds having at least two amino groups, for example dihydrazides of aliphatic dicarboxylic acids, as disclosed, for example, in DE-A-39 01 073, when the vinyl ester copolymer contains monomers containing carbonyl groups in copolymerized form.

It addition, it is possible to use, in the coating compositions, as further additives, waxes based on paraffins and polyethylene, and matting agents, defoamers, preservatives or hydrophobicizing agents, UV stabilizers, biocides, fibers, plasticizers and further additives known to those skilled in the art. Examples of plasticizers are dimethyl phthalate, diisobutyl phthalate, diisobutyl adipate, Coasol B® and Plastilit 3060®. Preferably no coalescent agents and plasticizers are used. Examples of defoamers are mineral oil defoamers or silicone defoamers. Examples of UV stabilizers are sterically hindered piperidine compounds (HALS) or benzophenone derivatives.

Coating compositions produced from the polymer dispersions described herein exhibit an excellent combination of blocking resistance, scrub resistance and stain resistance enabling their use as the sole binder in paints with higher sheens and lower pigment volume concentrations.

The following non-limiting Examples serve to illustrate the invention. The parts and percentages reported in the Examples are based on weight, unless stated otherwise.

Comparative Example C1

An aqueous solution consisting of the following ingredients was introduced into a 30 liter pressure reactor equipped with a stirrer, jacket heating and metering pumps: 8566 g of deionized (DI) water, 35 g of sodium acetate, 142 g of a 20% active solution of 88% saponified polyvinylalcohol (PVOH) with a viscosity of 4 mPas at 4% solids content, 327 g of a 65% active aqueous solution of an ethoxylated fatty alcohol with 30 ethylene oxide units, 322 g of a 22% active aqueous solution of sodium alkylbenzene sulphonate (branched), 284 g of a 25% active aqueous solution of sodium vinyl sulfonate (SVS). The atmosphere inside the reactor was flooded with nitrogen. 3929 g of vinyl acetate and 213 g of ethylene were charged to the reactor and the reaction mix was heated to 55° C.

For the ensuing polymerization, the following slow add solutions were prepared: a) monomer: 8304 g of vinyl acetate, 1076 g of butyl acrylate and 56.7 g of vinyltrimethoxy silane (VTMS), b) oxidizer: 40 g of sodium persulphate (NaPS) in 580 g of DI water, c) reducer: 25 g of Bruggolite®FF6M and 640 g DI water, d) stabilizer solution: 327 g of a 65% active aqueous solution of an ethoxylated fatty alcohol with 30 ethylene oxide units in 244 g of DI water.

Before the start of polymerization, 10% of the reducer solution is added to the reactor. Subsequently the polymerization is started by the parallel addition of the oxidizer at 192 g/h and the reducer at 184 g/h. After initiation of polymerization was observed through a temperature increase, the reactor temperature was raised to 70° C. and the addition of the stabilizer solution is started at a rate of 245 g/h. The reaction mixture is allowed to polymerize at 70° C. without addition of monomer mixture (a) for 30 min. After the 30 min. waiting period, the addition of monomer mixture (a) is started at a rate of 4530 g/h and an additional 640 g of ethylene is metered into the reactor. 30 min before the end of the addition of monomer mixture (a), the temperature is raised further to 87° C. After all additions are complete, the temperature is maintained at 87° C. for an additional 10 minutes before cooling down the reactor.

To reduce the amount of residual monomers, after degassing the resulting product was treated with 20 g of 70% active solution of t-butyl hydroperoxide (TBHP) diluted with 280 g of DI water and 12.5 g of Bruggolite®FF6M in 280 g of DI water and physically demonomerised under vacuum.

Comparative Example C2

An aqueous solution consisting of the following ingredients was introduced into a 30 liter pressure reactor equipped with a stirrer, jacket heating and metering pumps: 7422 g of DI water, 49 g of sodium acetate, 1419 g of a 10% active solution of 88% saponified polyvinylalcohol (PVOH) with a viscosity of 4 mPas at 4% solids content, 645 g of a 22% active aqueous solution of sodium alkylbenzene sulphonate (branched), 284 g of a 25% active aqueous solution of sodium vinyl sulfonate (SVS) and 2.8 g of Bruggolite®FF6M (Bruggemann Chemical). The atmosphere inside the reactor was flooded with nitrogen. 4726 g of vinyl acetate and 127 g of ethylene were charged to the reactor and the reaction mix was heated to 55° C.

For the ensuing polymerization, the following slow add solutions were prepared: a) monomer: 8196 g of vinyl acetate, b) oxidizer: 40 g of sodium persulphate (NaPS) in 580 g of DI water, c) reducer: 25 g of Bruggolite®FF6M and 640 g DI water, d) stabilizer: 199 g of 25% active SVS with 245 g of DI water. The polymerization is started by the parallel addition of the oxidizer at 249 g/h and the reducer at 265 g/h. After initiation of polymerization was observed through a temperature increase, the reactor temperature set point was raised to 70° C. and initiator rates are reduced to 185 g/h for the oxidizer and 200 g/h for the reducer and addition of the stabilizer solution is started at a rate of 190 g/h. The reaction mixture is allowed to polymerize at 70° C. without addition of monomer mixture (a) for 40 min. After the 40 min. waiting period, the addition of monomer mixture (a) is started at a rate of 4275 g/h and an additional 1140 g of ethylene is metered into the reactor. 30 min before the end of the vinyl acetate addition the temperature is raised further to 87° C. After all additions are complete, the temperature is maintained at 87° C. for an additional 10 minutes before cooling down the reactor.

To reduce the amount of residual monomers, after degassing the resulting product was treated with 20 g of 70% active solution of t-butyl hydroperoxide (TBHP) diluted with 280 g of DI water and 12.5 g of Bruggolite®FF6M in 280 g of DI water and physically demonomerised under vacuum.

Comparative Example C3

An aqueous solution consisting of the following ingredients was introduced into a 10 liter pressure reactor equipped with a stirrer, jacket heating and metering pumps: 2632 g of DI water, 17 g of sodium acetate, 508 g of a 10% active solution of Celvol® EA45, 231 g of a 22% active aqueous solution of sodium alkylbenzene sulphonate (branched), 102 g of a 25% active aqueous solution of sodium vinyl sulfonate (SVS) and 1g of Bruggolite®FF6M (Bruggemann Chemical). The atmosphere inside the reactor was flooded with nitrogen. 1118 g of vinyl acetate and 46 g of ethylene were charged to the reactor and the reaction mix was heated to 55° C.

For the ensuing polymerization, the following slow add solutions were prepared: a) monomer: 3307 g of vinyl acetate and 254 g of butyl acrylate (BA), b) oxidizer: 15 g of sodium persulphate (NaPS) in 208 g of DI water, c) reducer: 9 g of Bruggolite®FF6M and 228 g DI water, and d) stabilizer: 71 g of 25% active SVS with 87 g of DI water.

The polymerization is started by parallel addition of the oxidizer at 34 g/h and the reducer at 36 g/h. After initiation of polymerization was observed through a temperature increase, the reactor temperature set point was raised to 70° C., the addition of the stabilizer solution is started at a rate of 87 g/h and the addition of the monomer mixture (a) is started at 1379 g/h. The reaction mixture is allowed to polymerize at 70° C. for 40 min, at which time a further 348 g of ethylene is metered into the reactor (start of 2nd phase) and the initiator addition rates are raised to 71 g/h (oxidizer) and 75 g/h (reducer), while the addition of the monomer mixture (a) is maintained at a rate of 1379 g/h. 30 min before the end of the addition of monomer mixture (a) the temperature is raised further to 87° C. After all additions are complete, the temperature is maintained at 87° C. for an additional 10 minutes before cooling down the reactor.

To reduce the amount of residual monomers, after degassing the resulting product was treated with 7 g of 70% active solution of t-butyl hydroperoxide (TBHP) diluted with 100 g of DI water and 4.5 g of Bruggolite®FF6M in 100 g of DI water and physically demonomerised under vacuum.

Inventive Example E1

An aqueous solution consisting of the following ingredients was introduced into a 30 liter pressure reactor equipped with a stirrer, jacket heating and metering pumps: 8057 g of DI water, 52 g of sodium acetate, 529 g of a 20% active solution of 88% saponified polyvinylalcohol (PVOH) with a viscosity of 4 mPas at 4% solids content, 962 g of a 22% active aqueous solution of sodium alkylbenzene sulphonate (branched), 302 g of a 25% active aqueous solution of sodium vinyl sulfonate (SVS) and 144 g of a 65% active aqueous solution of an ethoxylated fatty alcohol with 30 ethylene oxide units. The atmosphere inside the reactor was flooded with nitrogen. 5033 g of vinyl acetate and 136 g of ethylene were charged to the reactor and the reaction mix was heated to 55° C.

For the ensuing polymerization, the following slow add solutions were prepared: a) monomer: 8132 g of vinyl acetate and 756 g of butyl acrylate (BA), b) oxidizer: 44 g of sodium persulphate (NaPS) in 620 g of DI water, c) reducer: 26 g of Bruggolite®FF6M and 680 g DI water, and d) stabilizer: 363 g of 25% active SVS with 260 g of DI water.

Before the start of polymerization, 10% of the reducer solution was added to the reactor. Subsequently the polymerization is started by the parallel addition of the oxidizer at 204 g/h and the reducer at 196 g/h. After initiation of polymerization was observed through a temperature increase, the reactor temperature set point was raised to 70° C. and the addition of the stabilizer solution is started at a rate of 267 g/h. The reaction mixture is allowed to polymerize at 70° C. without addition of the monomer mixture (a) for 40 min. After the 40 min. waiting period, the addition of monomer mixture (a) is started at a rate of 4635 g/h and an additional 1058 g of ethylene is metered into the reactor. 30 min before the end of the addition of monomer mixture (a) the temperature is raised further to 87° C. After all additions are complete, the temperature is maintained at 87° C. for an additional 10 minutes before cooling down the reactor.

To reduce the amount of residual monomers, after degassing the resulting product was treated with 21 g of 70% active solution of t-butyl hydroperoxide (TBHP) diluted with 300 g of DI water and 13.6 g of Bruggolite®FF6M in 300 g of DI water and physically demonomerised under vacuum.

Inventive Example E2

An aqueous solution consisting of the following ingredients was introduced into a 10 liter pressure reactor equipped with a stirrer, jacket heating and metering pumps: 3080 g of DI water, 17 g of sodium acetate, 57 g of hydroxy ethyl cellulose (HEC) with a viscosity of 100-180 mPas for a 5% active aqueous solution, 317 g of a 22% active aqueous solution of sodium alkylbenzene sulphonate (branched), 121 g of a 25% active aqueous solution of sodium vinyl sulfonate (SVS) and 1g of Bruggolite®FF6M (Bruggemann Chemical). The atmosphere inside the reactor was flooded with nitrogen. 1655 g of vinyl acetate and 45 g of ethylene were charged to the reactor and the reaction mixture was heated to 55° C.

For the ensuing polymerization, the following slow add solutions were prepared: a) monomer: 2674 g of vinyl acetate and 248 g of butyl acrylate (BA), b) oxidizer: 14 g of sodium persulphate (NaPS) in 204 g of DI water, c) reducer: 9 g of Bruggolite®FF6M and 224 g DI water, and d) stabilizer: 116 g of 25% active SVS with 86 g of DI water. The polymerization is started by the parallel addition of the oxidizer at 67 g/h and the reducer at 71 g/h. After initiation of polymerization was observed through a temperature increase, the reactor temperature set point was raised to 70° C. and the addition of the stabilizer solution is started at a rate of 86 g/h. The reaction mixture is allowed to polymerize at 70° C. without addition of the monomer mixture (a) for 40 min. After the 40 min. waiting period, the addition of monomer mixture (a) is started at a rate of 1525 g/h and an additional 348 g of ethylene is metered into the reactor. 30 min before the end of the addition of monomer mixture (a), the temperature is raised further to 87° C. After all additions are complete, the temperature is maintained at 87° C. for an additional 10 minutes before cooling down the reactor.

To reduce the amount of residual monomers, after degassing the resulting product was treated with 7 g of 70% active solution of t-butyl hydroperoxide (TBHP) diluted with 100 g of DI water and 4.5 g of Bruggolite®FF6M in 100 g of DI water and physically demonomerised under vacuum.

Inventive Example E3

An aqueous solution consisting of the following ingredients was introduced into a 10 liter pressure reactor equipped with a stirrer, jacket heating and metering pumps: 2750 g of DI water, 17 g of sodium acetate, 177 g of a 10% active solution of 88% saponified polyvinyl alcohol (PVOH) with a viscosity of 4 mPas at 4% solids content, 321 g of a 22% active aqueous solution of sodium alkylbenzene sulphonate (branched), 116 g of a 65% active aqueous solution of an ethoxylated secondary fatty alcohol with 30 EO and 101 g of a 25% active aqueous solution of sodium vinyl sulfonate (SVS). The atmosphere inside the reactor was flooded with nitrogen. 1400 g of vinyl acetate and 76 g of ethylene were charged to the reactor and the reaction mixture was heated to 55° C.

For the ensuing polymerization, the following slow add solutions were prepared: a) monomer: 2960 g of vinyl acetate, 384 g of butyl acrylate (BA) and 20 g of vinyltrimethoxysilane (VTMS), b) oxidizer: 14 g of sodium persulphate (NaPS) in 207 g of DI water, c) reducer: 9 g of Bruggolite®FF6M and 228 g DI water with 0.1 g of $FeSO_4(7H_2O)$, and d) stabilizer: 121 g of a 25% active aqueous solution of sodium vinyl sulfonate (SVS) in 87 g of DI water.

Before the start of polymerization 10% of the reducer solution was added to the reactor. Subsequently the polymerization is started by parallel addition of the oxidizer at 68 g/h and the reducer at 65 g/h. After initiation of polymerization was observed through a temperature increase, the reactor temperature set point was raised to 70° C. and the addition of the stabilizer solution is started at a rate of 89 g/h. The reaction mixture is allowed to polymerize at 70° C. without addition of monomer mixture (a) for 30 min. After the 30 min. waiting period, the addition of monomer mixture (a) is started at a rate of 1615 g/h and an additional 228 g of ethylene is metered into the reactor. 30 min before the end of the addition of monomer mixture (a), the temperature is raised further to 87° C. After all additions are complete, the temperature is maintained at 87° C. for an additional 10 minutes before cooling down the reactor.

To reduce the amount of residual monomers, after degassing the resulting product was treated with 7 g of 70% active solution of t-butyl hydroperoxide (TBHP) diluted with 100 g of DI water and 4.5 g of Bruggolite®FF6M in 100 g of DI water and physically demonomerised under vacuum.

Inventive Example E4

An aqueous solution consisting of the following ingredients was introduced into a 10 liter pressure reactor equipped with a stirrer, jacket heating and metering pumps: 2750 g of DI water, 17 g of sodium acetate, 177 g of a 10% active solution of 88% saponified polyvinyl alcohol (PVOH) with a viscosity of 4 mPas at 4% solids content, 321 g of a 22% active aqueous solution of sodium alkylbenzene sulphonate (branched) and 101 g of a 25% active aqueous solution of sodium vinyl sulfonate (SVS). The atmosphere inside the reactor was flooded with nitrogen. 1400 g of vinyl acetate and 76 g of ethylene were charged to the reactor and the reaction mixture was heated to 55° C.

For the ensuing polymerization, the following slow add solutions were prepared: a) monomer: 2960 g of vinyl acetate, 384 g of butyl acrylate (BA) and 20 g of vinyltrimethoxysilane (VTMS), b) oxidizer: 14 g of sodium persulphate (NaPS) in 207 g of DI water, c) reducer: 9 g of Bruggolite®FF6M and 228 g DI water with 0.1 g of $FeSO_4(7H_2O)$, and d) stabilizer: 121 g of a 25% active aqueous solution of sodium vinyl sulfonate (SVS) and 116 g of a 65% active aqueous solution of an ethoxylated secondary fatty alcohol with 30 EO in 87 g of DI water.

Before the start of polymerization 10% of the reducer solution was added to the reactor. Subsequently the polymerization is started by parallel addition of the oxidizer at 68 g/h and the reducer at 65 g/h. After initiation of polymerization was observed through a temperature increase, the reactor temperature set point was raised to 70° C. and the addition of the stabilizer solution was started at a rate of 89 g/h. The reaction mixture is allowed to polymerize at 70° C. without addition of monomer mixture (a) for 30 min. After the 30 min. waiting period, the addition of monomer mixture (a) is started at a rate of 1615 g/h and an additional 228 g of ethylene is metered into the reactor. 30 min before the end of the addition of monomer mixture (a) the temperature is raised further to 87° C. After all additions are complete, the temperature is maintained at 87° C. for an additional 10 minutes before cooling down the reactor.

To reduce the amount of residual monomers, after degassing the resulting product was treated with 7 g of 70% active solution of t-butyl hydroperoxide (TBHP) diluted with 100 g of DI water and 4.5 g of Bruggolite®FF6M in 100 g of DI water and physically demonomerised under vacuum.

The major compositional characteristics of the Comparative Examples C1-C3 and the Inventive Examples E1-E4 are summarized in Table 1, in which are values are in weight % based on the total weight of all monomers.

TABLE 1

|  | C1 | C2 | C3 | E1 | E2 | E3 | E4 |
|---|---|---|---|---|---|---|---|
| Monomers M1 (hard) | | | | | | | |
| Ethylene | 1.5 | 1 | 1 | 1 | 1 | 1.5 | 1.5 |
| Vinyl acetate | 28 | 33 | 32.5 | 33 | 33 | 28 | 28 |
| Butyl acrylate | 0 | 0 | 1 | 0 | 0 | 0 | 0 |
| Total M1 | 29.5 | 34 | 34.5 | 34 | 34 | 29.5 | 29.5 |
| Monomers M2 (soft) | | | | | | | |
| Ethylene | 4.5 | 8 | 7 | 7 | 7 | 4.5 | 4.5 |
| Vinyl acetate | 58.5 | 58 | 54.5 | 54 | 54 | 58.5 | 58.5 |
| Butyl acrylate | 7.5 | 0 | 4 | 5 | 5 | 7.5 | 7.5 |
| Total M2 | 70.5 | 66 | 65.5 | 66 | 66 | 70.5 | 70.5 |

TABLE 1-continued

|  | C1 | C2 | C3 | E1 | E2 | E3 | E4 |
|---|---|---|---|---|---|---|---|
| Stabilization | | | | | | | |
| Colloid | PVOH | PVOH | PVOH | PVOH | HEC | PVOH | PVOH |
| Anionic Surf. | 0.5 | 1.5 | 1.4 | 1.4 | 1.4 | 1.4 | 1.4 |
| Nonionic Surf | 3.0 | 0 | 0 | 0.6 | 0 | 1.5 | 1.5 |

The physical properties of the polymer dispersions produced in Comparative Examples C1-C3 and Inventive Examples E1-E4 are summarized in Table 2.

TABLE 2

|  | C1 | C2 | C3 | E1 | E2 | E3 | E4 |
|---|---|---|---|---|---|---|---|
| Solids | 56% | 54.5% | 54.5% | 56.3% | 54% | 55.5% | 56.5% |
| Solids[1], stage 1 | 28% | 27.5% | 29% | 33.5% | 30% | 29% | 29.5% |
| Tg[1] stage 1 | 22° C. | 38° C. | 36.5° C. | 32° C. | 38° C. | 25.5° C. | 35° C. |
| Tg stage 1 final | n.d. | n.d. | n.d. | 29° C. | n.d. | 27.5° C. | 26° C. |
| Tg stage 2 final | 20.5° C. | 19° C. | 18.5° C. | 15° C. | 17° C. | 19° C. | 19° C. |
| Particle size [nm][2] | 270 | 209 | 214 | 260 | 439 | 180 | 230 |
| Viscosity [mPa s][3] | 374 | 1370 | 1090 | 1120 | 1870 | 990 | 1040 |
| pH | 5 | 5.1 | 5.2 | 5.1 | 5 | 5 | 4.9 | n.d. = not detected
[1]measured on a sample taken before starting ethylene addition. Tg as measured by differential scanning calorimetry (DSC) according to ISO 16805.
[2]Weight-average particle diameter as determined by a Beckman Coulter LS 13320 Particle Size Analyzer
[3]Brookfield viscosity measurement conditions: 20° C., 20 rpm, spindle 3

Paint Formulations

Paint formulations were produced from the polymer dispersions produced in Comparative Examples C1-C3 and Inventive Examples E1-E4 using the ingredients listed in Table 3. The experimental VAE latexes were tested in a 25 PVC semi-gloss paint formulation. The formulation used Coalescent CLX, a zero VOC coalescent available from Celanese.

TABLE 3

| Ingredient | Grams |
|---|---|
| Water | 275.00 |
| Natrosol Plus 330 | 2.50 |
| AMP-95 | 2.75 |
| Acticide BW 20 | 2.00 |
| Foamaster MO 2185 | 3.00 |
| Acrymal L-216 | 3.00 |
| PSL RM-45 | 4.00 |
| Tronox CR-826 | 200.00 |
| Burgess No. 28 | 50.00 |
| Minex 10 | 25.00 |
| Water | 35.00 |
| VAE emulsion (55% Solids) | 450.00 |
| Foamaster MO 2185 | 1.00 |
| Celanese CLX | 6.00 |

TABLE 3-continued

| Ingredient | Grams |
|---|---|
| Acrysol RM-2020 NPR | 5.50 |
| Acrysol RM-825 | 5.00 |
| Foamaster MO 2185 | 1.00 |
| AquaKlean 403 | 7.43 |
| Total | 1078.18 |

Natrosol Plus 330 is a hydroxyethyl cellulose thickener available from Ashland, Inc. AMP-95 is a 2-amino-2-methyl-1-proanol pH adjuster/buffer available from ANGUS Chemical Company.

Acticide BW 20 is an aqueous based benzoisothiazolinone preservative available from Thor Specialties, Inc.

Foamaster MO 2185 is a 100% active defoamer available from BASF, Inc.

Acrymal L 216 and PSL RM 45 are a fluoro-surfactant and anionic surfactant respectively, sold by Peach State Labs.

Tronox CR-826 is a silica/alumina treated rutile titanium pigment available from Tronox, Inc. Burgess 28 is a hydrous aluminum silicate pigment available from Burgess Pigment Company.

Minex 10 is nepheline syenite extender pigment available from Unimin Specialty Minerals, Inc.

Acrysol RM-2020 NPR and Acrysol RM-825 are nonionic hydrophobically modified polyethylene oxide urethane thickeners available from Dow Inc.

Coalescent CLX is a zero VOC coalescent based on triethylene glycol bis(2-ethylhexanoate) available from Celanese Corporation Aquaklean 403 is a micronized polyethylene wax available from Micro Powders, Inc.

The characteristics of the resultant paint formulations are summarized in Table 4.

TABLE 4

| Density (lbs/gal) | 10.60 |
|---|---|
| PVC (%) | 25% |
| Weight Solids (%) | 50.41% |
| Volume Solids (%) | 37.13% |

The optical properties of the paint formulations were measured on 3 mil drawdowns (6" Bird Bar) on BYK opacity charts dried for 7 days in a constant temperature (23° C.) and humidity (50%) room. The results, together with the viscosity value of the different paint formulations, are summarized in Table 5

TABLE 5

|  | C1 | C2 | C3 | E1 | E2 | E3 | E4 |
|---|---|---|---|---|---|---|---|
| Viscosity [KU] | 98.5 | 111.5 | 111.8 | 103.0 | 93.7 | 104.7 | 102.1 |
| Gloss 60° | 46.9 | 36.3 | 31.7 | 52.2 | 39.6 | 50.9 | 50.2 |
| Gloss 85° | 79.3 | 74.7 | 76.3 | 83.6 | 77.8 | 83.1 | 83.4 |
| Opacity | 97.9% | 97.7% | 98.0% | 98.2% | 97.7% | 98.2% | 98.3% |

It can be seen that the general properties of all paints summarized in Table 5 fall within the expected gloss and sheen range for semi-gloss paint.

Paint Testing Procedures

The following test procedures were used to evaluate the latex paints formulations described above.

Block Resistance Testing

ASTM D4946 is used to evaluate blocking of a paint formulation. The block resistance method procedure is as follows:

Materials Required
1. (6") 6 mil clearance Bird Bar.
2. Vacuum plate.
3. Sealed test chart.
4. Paint sample.
5. Paper cutter.
6. 1 Kg weight.
7. 50° C. oven.
8. Stopwatch or timer.

Procedure

Preparation of the Drawdown
1. Turn on the vacuum pump and center test chart on vacuum plate and label accordingly
2. Place a clean 6 mil drawdown bar below the labeled portion of the chart
3. Stir the paint sample first to insure homogeneity and dab sufficient paint near the edge of the blade to form a continuous film along the length of the panel
4. Draw 6 mil bar slowly and evenly to the length of the chart
5. Clean and dry the bar immediately
6. Remove the chart to a horizontal surface Repeat the procedure for each sample.

The block test can be performed once the cards have conditioned for a minimum of 16 hours
1. Using a paper cutter, cut fully painted covered squares 1.5" (4 cm) wide. Six squares are needed for each period of testing.
2. Pair the squares face to face and label each with the appropriate information, sample number, ambient (RT) or oven (OV).
3. Place three pairs of squares in constant temperature room on a continuous flat surface and center one #8 rubber stopper (narrow end down) and place 1 Kg weight on square.
4. Remove stopper and weight from this pair of squares the next day.
5. Please another three pairs of squares in the oven at 50 C and repeat step 4
6. After 30 minutes remove the second pair from the oven and cool Evaluation of Test Samples Evaluation of the samples are done after the panels have dried for 24 hours or 7 days. Record the results.
1. Pull the squares apart looking for sounds, tack, and looking for signs of film damage or rupture.
2. Rate the squares according to the given numerical ratings in Table 6.

TABLE 6

| RATING | DESCRIPTION |
|---|---|
| 10 | No tack |
| 9 | Tace tack |
| 8 | Very slicht tack |
| 7 | Very slight to slight tack |
| 6 | Slight tack |
| 5 | Moderate tack |
| 4 | Very tacky |
| 3 | Film ruptures 5-25% |

TABLE 6-continued

| RATING | DESCRIPTION |
|---|---|
| 2 | Film ruptures 25-50% |
| 1 | Film ruptures 50-75% |
| 0 | Film ruptures 75-100% |

Scrub Resistance Testing

The scrub resistance test was done per ASTM D2486. Test paints and a control paint were prepared by drawing a 7 mil film of paint on a Leneta black plastic sheet. The drawdowns were dried in a constant temperature (23° C.) and humidity (50%) room for 7 days. The dried chart was affixed to the glass panel and put into a scrub machine equipped with a scrub brush and a basin for holding the scrub panel. The brush was prepared by immersing it in water overnight. Immediately before running the scrub test, the brush was conditioned by running 400 cycles on an uncoated Leneta sheet. The brush was placed in the brush holder and the test panel was put under the brush and clamped to the glass panel. The brush bristles were spread evenly with 10 grams of abrasive medium (BYK Gardner). The panel was then wet with 5 ml of water along the path of the brush. The scrub machine was started and after every 400 cycles until film breakthrough, the machine was stopped and 10 g of abrasive medium was evenly spread on the brush bristles and the panel was wet 5 ml of water along the path of the brush. The number of scrub cycles that caused film breakthrough to occur when scrubbed over a shim was recorded. The scrub resistance test was run in duplicate on the same drawdown using two different machines with different nylon brushes. The relative scrub index was expressed in percent relative to the control paint sample. The results are summarized in Table 6.

Scrubbability Per Master Painters Institute (MPI) Method

Indicative scrubbability testing was performed per the MPI 147 performance standard. Paints were drawn down over the entire length of a black Leneta plastic sheet using a drawbar with a 7-mil gap, similar to the ASTM D2486 procedure. The drawdowns were dried in a constant temperature (23áC) and humidity (50%) room for 7 days. A 2% solution of nonylphenol ethoxylate surfactant (IGEPAL CO-630, available from Sigma-Aldrich) was used as the scrub medium. The solution was added at a rate of 8 to 10 drops per minute to the scrub panel under testing using a peristaltic pump (available from Cole-Parmer). The scrub panel was scrubbed continuously for 4000 cycles, washed under tap water, and dried for 24 hours. The drawdowns were inspected for film breakthrough and 600 gloss change. If the paints did not show film breakthrough and showed less than 20% change in 600 gloss, they were considered acceptable for further evaluation. The results are summarized in Table 7.

Stain Resistance Per Master Painters Institute (MPI) Method

Indicative testing of stain resistance was performed per the MPI 147 performance standard. Paints were drawn down over the entire length of a white Leneta plastic sheet using a drawbar with 7-mil gap per ASTM D2486. The drawdowns were dried in a constant temperature (23° C.) and humidity (50%) room for 7 days. The test specimens were stained with graphite (available from Sigma Aldrich, 20 micron particle size), hot coffee (Kirtland dark French roast), and 2% nigrosin dye solution (available from Sigma-Aldrich) following the procedure described in the MPI 147 standard (available from Master Painters Institute, www.specifypaint.com/MPIStore_us.asp). A 1% solution of nonylphenol ethoxylate surfactant (IGEPAL CO-630) and 0.5% trisodium phosphate (available from Sigma-Aldrich) was used as the cleansing medium. The solution was added at a rate of 8 to 10 drops per minute to the scrub panel under testing using a peristaltic pump. The stain panel was washed continuously with a cellulose sponge for 1000 cycles. After washing with the sponge, the panels were washed with tap water per instructions in MPI 147 standard and dried for 24 hours. The color difference between the unstained washed and stained washed portions was measured using a BYK Gardner spectrophotometer. The color difference was expressed as $\Delta E^*$ for each stain. The results are summarized in Table 7.

TABLE 7

| | C1 | C2 | C3 | E1 | E2 | E3 | E4 |
|---|---|---|---|---|---|---|---|
| Block 1d RT | 0.0 | 5.3 | 4.0 | 5.3 | 8.0 | 6.7 | 7.0 |
| Block 7d RT | 3.3 | 7.7 | 8.0 | 6.7 | 9.0 | 7.3 | 8.0 |
| Block 1d 50° C. | 0.0 | 5.0 | 5.0 | 7.0 | 7.0 | 4.7 | 5.7 |
| Block 7d 50° C. | 0.0 | 5.7 | 6.7 | 6.0 | 8.0 | 6.0 | 7.3 |
| $\Delta E^*$ Graphite | 0.09 | 4.00 | 3.54 | 0.10 | 0.21 | 0.15 | 0.11 |
| $\Delta E^*$ Coffee | 0.31 | 1.95 | 0.80 | 1.21 | 1.95 | 0.45 | 0.82 |
| $\Delta E^*$ Nigrosin | 1.30 | 7.12 | 6.40 | 6.20 | 7.06 | 1.54 | 1.63 |
| Average ASTM Scrubs | 486 | 845 | 528 | 330 | 542 | 475 | 431 |
| MPI 147 (60° gloss loss) | 6.3% | — | — | 15.0% | — | 6.3% | 7.2% |

Discussion of the Results

It can be seen from Table 7 that the paints produced from the polymer dispersions of Inventive Examples E1-E4 exhibit a combination of improved blocking resistance, especially after 7 days drying, without significant reduction in scrub resistance and improved stain resistance to graphite as compared to the paints produced from the polymer dispersions of Comparative Examples C1-C4. The silane-containing dispersions of Examples E3 and E4 also gave good stain resistance to coffee and nigrosine.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. An aqueous copolymer dispersion obtained by a free radical-initiated multi-stage emulsion polymerization process comprising:
(a) polymerizing in a reaction zone in a first polymerization stage a first monomer composition comprising at least 88 weight percent of at least one vinyl ester of a $C_1$ to $C_{18}$ carboxylic acid and up to 12 weight percent ethylene to produce a first stage polymer having a glass transition temperature Tg of greater than 20° ° C.; and (b) polymerizing in the reaction zone, in a second polymerization stage and in the presence of the first stage polymer, a second, different monomer composition comprising at least one vinyl ester of a $C_1$ to $C_{18}$ carboxylic acid and at least one $C_2$ to $C_8$ alkyl ester of acrylic or methacrylic acid in an amount up to 30 weight percent of the total monomers in the second monomer composition to produce a second stage polymer having a glass transition temperature Tg of less than or equal to 20° ° C., wherein the first monomer composition is substantially free of $C_2$ to $C_8$ alkyl esters of acrylic or methacrylic acid;

wherein the second monomer composition is metered into the reaction zone during at least part of the second polymerization stage, and wherein each of the polymerization stages (a) and (b) is conducted in the presence of a stabilizing system which comprises at least 0.1 weight percent of at least one protective colloid, at least 0.05 weight percent of at least one ionic surfactant and less than 2 weight percent of nonionic surfactant, all percentages in the stabilizing system being based on the total weight of monomers in the first and second monomer compositions.

2. The dispersion of claim 1, wherein first monomer composition comprises at least 90 weight percent of the at least one vinyl ester of a $C_1$ to $C_{18}$ carboxylic acid.

3. The dispersion of claim 1, wherein the at least one vinyl ester of a $C_1$ to $C_{18}$ carboxylic acid of the first monomer composition comprises vinyl acetate.

4. The dispersion of claim 1, wherein the first stage polymer has a glass transition temperature Tg of at least 26° C.

5. The dispersion of claim 1, wherein the at least one vinyl ester of a $C_1$ to $C_{18}$ carboxylic acid and any ethylene present in the first monomer composition are added to the reaction zone before initiation of the first polymerization stage.

6. The dispersion of claim 1, wherein a further monomer selected from the group of ethylenically unsaturated sulfonic acids, ethylenically unsaturated phosphonic and ethylenically unsaturated phosphoric acids and salts thereof is metered into the reaction zone during at least part of the polymerizing stage (a).

7. The dispersion of claim 6, wherein the further monomer comprises vinyl sulfonic acid or a salt thereof.

8. The dispersion of claim 1, wherein the second monomer composition comprises at least 50 weight percent of the at least one vinyl ester of a $C_1$ to $C_{18}$ carboxylic acid.

9. The dispersion of claim 1, wherein the at least one vinyl ester of a $C_1$ to $C_{18}$ carboxylic acid of the second monomer composition comprises vinyl acetate.

10. The dispersion of claim 1, wherein the second monomer composition comprises from 5 to 15 weight percent of at least one $C_2$ to $C_8$ alkyl ester of acrylic or methacrylic acid.

11. The dispersion of claim 1, wherein the at least one $C_2$ to $C_8$ alkyl ester of acrylic or methacrylic acid of the second monomer composition comprises n-butyl acrylate.

12. The dispersion of claim 1, wherein the second stage polymer has a glass transition temperature Tg of 0 to 20° C., preferably 5 to 20° ° C.

13. The dispersion of claim 1, wherein the first monomer composition comprises from 5 to 95 weight percent, preferably 20 to 40 weight percent, of the total amount of monomers in the first and second monomer compositions.

14. A coating composition comprising an aqueous copolymer dispersion of claim 1.

15. A paint formulation comprising the coating composition of claim 14.

16. A paint coating produced from the paint formulation of claim 15 and exhibiting a block resistance of at least 6 when subjected to testing according to ASTM D4946 after drying for 7 days at 23° C. and a color change (ΔE) of less than 2 when subjected to testing for stain resistance to graphite according to MPI 147 after drying for 7 days at 23° ° C. and 50% humidity.

* * * * *